United States Patent
Turner

[15] 3,674,134
[45] July 4, 1972

[54] RUPTURABLE CONTAINER

[72] Inventor: Charles D. Turner, Laguna Beach, Calif.

[73] Assignee: Kay Laboratories, Inc., Santa Ana, Calif.

[22] Filed: March 13, 1970

[21] Appl. No.: 19,202

[52] U.S. Cl. ..................................... 206/47 A, 229/51 WB
[51] Int. Cl. ............................................................ B65d 79/00
[58] Field of Search ............. 206/47 A, 84; 229/51 WB, 48 T, 229/66

[56] References Cited

UNITED STATES PATENTS

| | | | |
|---|---|---|---|
| 3,329,331 | 7/1967 | Morgan | 229/51 W B |
| 3,272,324 | 9/1966 | Schneider et al. | 206/47 A |
| 3,342,324 | 9/1967 | Piazze | 206/47 A |
| 3,217,871 | 11/1965 | Lee | 229/51 W B X |
| 3,116,869 | 1/1964 | Kaufield | 229/48 T X |
| 3,256,981 | 6/1966 | Kurtz | 229/51 WB X |
| 3,294,227 | 12/1966 | Schneider et al. | 206/47 A |
| 3,454,210 | 7/1969 | Spiegel et al. | 229/51 W B X |
| 3,497,131 | 2/1970 | Tracy | 229/66 |

Primary Examiner—Joseph R. Leclair
Assistant Examiner—Steven E. Lipman
Attorney—Smyth, Roston & Pavitt

[57] ABSTRACT

A rupturable container including first and second layers of flexible sheet material bonded together to form a laminated sheet material construction. Preselected confronting regions of the first and second layers are bonded together less securely than the remaining regions of the laminate. The laminated sheet material is appropriately joined together to form a closed container which is adapted to contain a substance. The preselected regions may also be mechanically weakened. When the container is struck, the weakened region ruptures to expose the substance within the container.

13 Claims, 4 Drawing Figures

PATENTED JUL 4 1972

3,674,134

INVENTOR.
Charles D. Turner

ATTORNEYS

RUPTURABLE CONTAINER

BACKGROUND OF THE INVENTION

This invention relates to a rupturable container such as a relatively flexible sealed bag. Although the rupturable container can be used in many environments, it is particularly adapted for separating one chemical from another so that upon rupture of the rupturable container, the two chemicals are allowed to mix and chemically react.

The rupturable container is specifically adapted for use in a hot or cold pack. In such a pack, the rupturable container contains a first chemical and a second chemical is positioned adjacent the rupturable container. Upon rupturing of the rupturable container, the first and second chemicals react to give off heat or to absorb heat to thereby produce the desired heating or cooling effect.

It is necessary that a rupturable container of this type be very tightly sealable to prevent premixing of the chemicals, and the flexible material of the container must pass a minimum amount of chemical vapors therethrough. The thin flexible material of the container must be easily machine handled and must be inexpensive as the rupturable containers are disposable. Perhaps most important, the rupturable container must not fracture during normal handling and storage but must fracture easily when struck with an intentional blow for the purpose of rupturing the container.

Many attempts at constructing such a container have been made and each has proven unsatisfactory. For example, it has been proposed to utilize a bag constructed of thin plastic material and to heat seal the bag to make it fluid tight. Efforts have been made to control the heat seal so that the bag will rupture therealong. It has been found that controlling the heat seal in this manner is most difficult and that the results obtained have not been at all satisfactory.

Another construction employed heretofore involves the use of the dual bag construction. This bag was difficult to break as it had to be struck two times, once for each of the bags. Furthermore, there was no assurance that the bags would rupture when struck. Still another attempt involved scoring of the sheet material of the bag; however, this also proved unsatisfactory.

SUMMARY OF THE INVENTION

One aspect of the present invention involves the use of laminated flexible sheet material to make a rupturable container or bag. By laminating first and second layers, desirable physical properties can be obtained. For example, container strength can be improved by using laminated sheet material as the strength properties of the laminate exceeds the sum of the physical properties of the individual layers. In addition, a heat sealing capability can be provided through the use of laminated sheet material for the container.

On the other hand, some laminated sheet material is very strong and is difficult to rupture. The present invention, however, provides two separate ways for preweakening a container constructed of flexible laminated sheet material. Each of the weakening features contributes individually to the ultimate weakening effect obtained; however, for a maximum weakening effect, both of the weakening features should be employed. By weakening the container in accordance with this invention, the rupturing area of the container is controlled.

The first weakening feature of this invention is to provide a relatively poor bond or connection between the first and second layers at a preselected region which is to be ruptured. The bond should be of low strength so that when the container is struck with a rupturing blow, the two layers will delaminate and move relative to each other. It is believed that such delamination of the plastic layers is instrumental in initiating the formation of an opening in the container to allow escape of the contents thereof.

To further weaken the container, it may be desirable to mechanically weaken the container at the region where the bond between the plastic layers is relatively weak. Such mechanical weakening can be brought about, for example, by creasing of the layers provided that one of the layers is sufficiently brittle to be weakened by the creasing. Creasing is particularly effective when one of the plastic layers is relatively brittle such as a polyester film made from polyethylene terephthalate (commonly designated by the trademark Mylar). Mechanical weakening is also inherently accomplished during bag formation in the heat sealing operation which may involve stretching or compressing of one or both of the layers. When the container is mechanically weakened at the region which will delaminate, the resultant container can be ruptured quite easily by an impact blow.

The bond between the layers at the region to be ruptured is preferably weaker than the bond between the other regions of the layers. With a strong bond between the first and second layers at such other regions the resultant container is of maximum strength. However, if the container is also mechanically weakened, the bond between layers may be relatively uniform over the full areas of the layers.

The two layers are preferably secured together with an adhesive although other means may be utilized. The adhesive may form either a chemical or mechanical bond between the layers.

To inhibit the adherence of the two layers at the preselected rupturable region of the container, an intermediate layer of any suitable material can be utilized. For example, such intermediate layer may be ink of the type often employed for writing on plastic containers such as a flexographic press ink compatible with plastic films and lamination. The ink inhibits the action of the adhesive in joining the two layers together so that only a relatively weak bond is formed at the rupturable region.

Each of the first and second layers is preferably a thin flexible sheet of plastic material. In a preferred form of the invention, the first layer is a strong plastic subject to mechanical weakening such as Mylar. Although Mylar is very strong, it is easily torn once a tear is initiated. Its low resistance to tearing once a tear is initiated facilitates the formation of a relatively large opening in the container which is useful in assuring complete mixing of the chemicals when the rupturable bag is utilized to initiate a chemical reaction.

Mylar is not heat sealable, however, so the second layer is preferably a heat sealable plastic such as polyethylene. Polyethylene is relatively easily stretched and it is believed that the polyethylene adds desirable strength properties to the container. With one layer of the laminate being heat sealable, the resultant container can be formed by heat sealing appropriate regions of the laminate together. Preferably the heat sealing forms a seam which projects outwardly of the container and is folded over at the juncture of the seam and the container to thereby crease and mechanically weaken the sheet material at the juncture of the seam and the container.

The invention, both as to its organization and method of operation, together with further features and advantages thereof, may best be understood by reference to the following description taken in connection with the accompanying illustrative drawings.

DESCRIPTION OF THE PREFERRED EMBODIMENT

Figure 1:
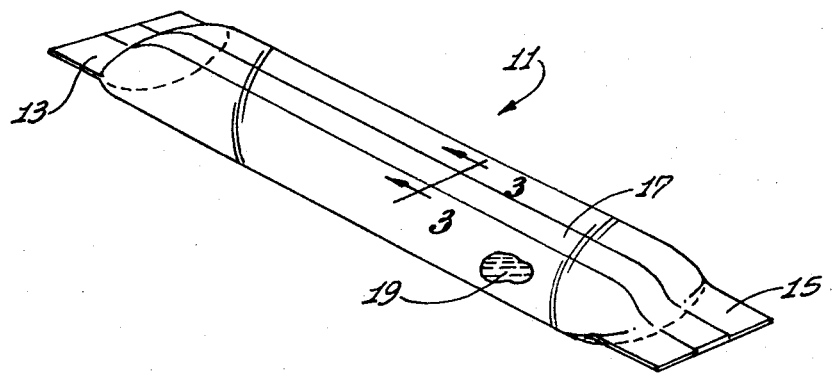
FIG. 1 is a perspective view of a rupturable container constructed in accordance with the teachings of this invention.

Referring to the drawings, reference numeral 11 designates a rupturable container or bag constructed in accordance with the teachings of this invention. The opposite ends of the container 11 are sealed by seams 13 and 15 and the container is sealed longitudinally between the seams 13 and 15 by longitudinal seam 17. The seams 13, 15 and 17 may be the result of heat sealing. As used herein heat sealing means the formation of a seal through the application of heat and/or pressure to the regions to be sealed. The container 11 is adapted to contain a chemical 19 which may be in liquid form such as water.

Figure 2:
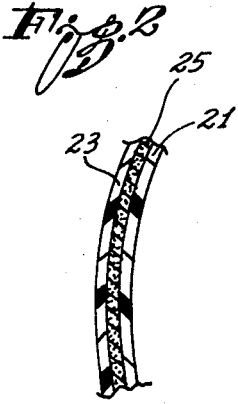
FIG. 2 is a fragmentary sectional view illustrating the wall construction of the container.
Figure 3:
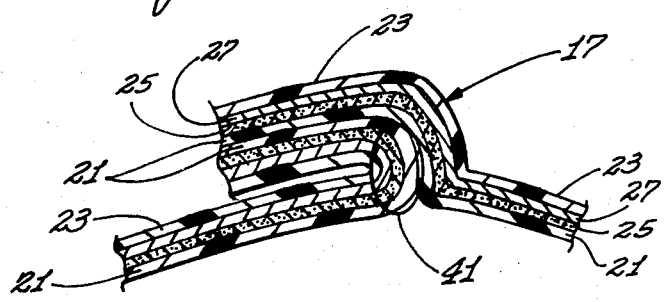
FIG. 3 is a fragmentary sectional view taken along line 3—3 of FIG. 1 and illustrating a heat seal for closing the rupturable container.

The details of construction of the container 11 can best be understood by reference to FIGS. 2 and 3. It should be understood that the thicknesses of the layers shown in FIG. 2 are not to scale and that these thicknesses have been greatly exaggerated for purposes of illustration.

The container 11 has an inner layer of sheet material 21 and an outer layer of sheet material 23 bonded to the inner layer 21 by a layer of adhesive 25. Each of the layers 21 and 23 is preferably relatively flexible and constructed of a plastic material. The layers 21 and 23 are preferably substantially coextensive and when bonded together by the adhesive 25 form a strong flexible laminate which imparts substantial strength to the container 11.

The inner layer 21 should be heat sealable to facilitate fabrication of the container 11. A suitable heat sealable plastic material is polyethylene. It is preferred to use low density polyethylene because it is not expensive and because it is easily heat sealed over a relatively wide temperature range. The polyethylene sheet is very flexible and will readily elongate when placed in tension. However, the polyethylene sheet is not particularly strong.

The outer layer 23 is preferably relatively strong and may be, for example, 50 gauge Seran coated polyester such as Dupont M24 Mylar. Mylar has high tensile strength, stable properties over a wide temperature range and a hard finish. Mylar is easily torn once a tear is initiated and is brittle in the sense that the formation of a crease therein will make it more easily rupturable. Both Mylar and polyethylene are machinable in the sense that they can be easily handled by container making equipment. To reduce the moisture vapor transmission rate, the Mylar is preferably Seran coated. The resultant laminated construction is quite thin. For example, the Seran coated Mylar layer may be 0.0005 inch thick and the polyethylene layer may be 0.002 inch thick.

The adhesive 25 may be any suitable type of adhesive which will form the desired bond between the layers 21 and 23. It has been found that a polyurethane adhesive compound is suitable for use with polyethylene and Mylar.

The inner layers 21 are heat sealed to form the seams 13, 15 and 17. As shown in FIG. 3, the seam 17 includes overlapping regions of the laminate which project outwardly of the container 11 and are folded over to form a crease in the laminate. In the embodiment illustrated, the heat seal for the seam 17 terminates short of the ends of the overlapping layers of sheet material.

The construction of the wall of the container 11 is somewhat different adjacent the seam 17 as shown in FIG. 3. Specifically, an intermediate or inhibiting layer is provided between the layers 21 and 23. The primary purpose of the inhibiting layer 27 is to inhibit the adhesive action of the adhesive 25 in bonding the layers 21 and 23 together. Of course, the inhibiting effect of the layer 27 is only found in the locality in which the layer 27 is put. The result is that the layers 21 and 23 are loosely bonded together by the adhesive 25 at all regions therealong at which the intermediate layer 27 is present. It follows, therefore, that the intermediate layer 27 should be placed only at the regions where the inhibiting effect is desired. In the specific embodiment illustrated, the intermediate layer 27 extends from a location on the sidewall of the container 11 adjacent the seam 17 completely through the overlapping layers which define the seam. With this construction, the layers 21 and 23 are bonded together loosely in the regions thereof adjacent the seam 17.

For purposes of illustration, the adhesive layer 25 and the intermediate layer 27 in FIG. 3 are illustrated as separate, discrete layers. It is presumed that the adhesive 25 weakly adheres to the intermediate layer 27 and/or to the outer layer.

According to the illustrated embodiment of the invention, the region of the container adjacent the seam 17 is mechanically weakened by folding over the overlapping layers of the laminate shown in FIG. 3. The normal machine handling of the container during the heat sealing operation which forms the seam 17 may also tend to mechanically weaken this region of the container. When the outer layer 23 is constructed of Mylar, this mechanical weakening has the most pronounced effect on the Mylar.

In actual use, the container 11 is filled with the fluid 19. In the embodiment illustrated, the fluid 19 is a substantially non-compressible liquid such as water. When the flexible container 11 is struck, the resultant force tends to force the water 19 outwardly. In the construction illustrated, the weakest region is adjacent the juncture of the seam 17 with the remainder of the container 11. Specifically, it has been found that fracture of the container will normally occur generally within the enclosed region designated by reference numeral 41 in FIG. 3.

Although it is difficult to analyze specifically why rupture occurs in this area, it is believed that the outward force on the container caused by the impact blow first delaminates the layers 21 and 23. Such delamination occurs easily because the bond between the layers 21 and 23 in the region 41 is quite weak due to the presence of the intermediate layer 27. Once delamination in the region 41 occurs, the layers 21 and 23 possess only their individual strength characteristics which are not nearly so great as the strength characteristics of the laminated construction. For this reason, the region 41 is weaker than the areas of the container which are securely bonded together by the adhesive 25. In addition, the heat sealing operation in forming the seam 17 and the folding over of the sheet material of the seam 17 are believed to mechanically weaken the region 41. Thus, by providing a relatively poor lamination in the region 41 and by mechanically weakening through creasing of the material, the region 41 ruptures quite easily in response to an impact blow.

Figure 4:
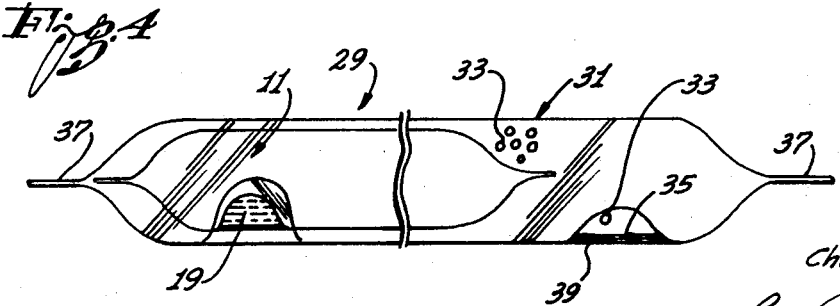
FIG. 4 is an elevational view partially in section of a hot or cold pack utilizing the rupturable container of this invention.

FIG. 4 illustrates a use for the container 11 for which the latter is particularly adapted. FIG. 4 illustrates a pack 29 which includes an outer container 31 having the rupturable container 11 and a chemical 33 therein. The container 29 may be made from one or more suitable layers of material to provide the desired properties for the container. For example, the container 29 may have an inner layer 35 of a polyethylene composition to allow the inner surfaces of the container 31 to be sealed as by the application of heat and pressure to form a seam 37. The container 29 may also include an outer layer 39 of suitable material such as polyethylene terephthalate to impart strength to the container.

The chemical 33 in the embodiment illustrated is a solid granular material and is sealed within the container 29. If the pack 29 is intended to apply heat to an object, the chemical 33 may be anhydrous calcium chloride ($CaCl_2$). When the pack is to remove heat from an object, the chemical 33 may be ammonium nitrate ($NH_4NO_3$). The ammonium nitrate may be commercial grade particles which may be partially ground before they are placed in the container 10. Commercial grade ammonium nitrate generally includes particles or pellets having a clay coating. By partially grinding the particles or pellets, the clay coating becomes ruptured to expose the ammonium nitrate.

The rupturable container 11 in the embodiment illustrated is disposed within the container 29 and is sealed so that the chemical 19 therein is sealed from the chemical 33. If the pack 29 is to be a hot or cold pack, the chemical 19 within the rupturable container 11 may be water.

It is apparent that the rupturable container 11 must be tightly sealed to prevent mixing of the water 19 with the chemical 33. Similarly, the container 29 must be tightly sealed so that when the chemicals 19 and 33 are permitted to mix, the resultant reaction is confined within the container 29. Because the container 11 is flexible and is filled with a liquid, striking of the container 11 causes the water to be forced against the container to rupture the latter. As the container 29 is also flexible, it will readily transmit impact forces directed thereagainst to the container 11 to rupture the latter and allow mixing of the chemicals 19 and 33 to produce the desired chemical reaction. Mixing of the chemicals 19 and 33 subsequent to rupture of the container 11 can be facilitated by shaking or kneading of the container 29.

Although an exemplary embodiment of the invention has been shown and described, many changes, modifications, and substitutions may be made by one having ordinary skill in the art without necessarily departing from the spirit and scope of this invention.

I claim:

1. A rupturable container comprising:
   a first layer of flexible sheet material;
   a second layer of flexible sheet material;
   first means bonding said layers together over first regions of said layers to form laminated sheet material;
   second means preventing preselected confronting regions of said layers from being bonded together as securely as said first regions; and
   third means joining zones of the second layer of said laminated sheet material together to form a closed container, said first and second layers being folded back on each other and being creased at said preselected confronting regions of said layers to form a mechanically weakened region of the container at said preselected confronting regions whereby when the container is struck said weakened region ruptures as a result of the action in said second means and the mechanical weakening of said preselected confronting regions to expose said substance.

2. A container as defined in claim 1 wherein
   said first means includes an adhesive capable of bonding said first and second layers,
   said second means includes an intermediate layer of material between said first and second layers which inhibits the bonding action of said adhesive at said preselected confronting regions;
   whereby said preselected regions readily delaminate when the container is struck to thereby facilitate rupture of the container.

3. A container as defined in claim 1 wherein said mechanical weakening occurs in less than all of the layers comprising said laminated sheet material.

4. A rupturable closed container adapted to contain a substance comprising:
   a first layer of nonheat sealable, relatively flexible sheet material;
   a second layer of heat sealable relatively flexible sheet material;
   first means for bonding said first and second layers together to form a laminate;
   regions of said second layer of said laminate being heat sealed together to form the container;
   said first means weakly bonding said first and second layers together at least at a zone of the container whereby the bonding at said zone is weaker than the bonding at other portions of the laminate; and
   said first and second layers being bent back upon one another and being creased at said zone of the container to mechanically weaken at least one of said layers at said zone and to facilitate the rupture of said container at said zone.

5. A container as defined in claim 4 wherein the heat sealing of said regions of the second layer forms a seam along the container and said zone is at at least a portion of said seam.

6. A container as defined in claim 5 wherein said seam includes overlapping regions of said laminate which project outwardly of said container and are substantially creased at the juncture of the seam and the container to thereby mechanically weaken said zone.

7. A container as defined in claim 6 wherein said first and second layers are generally coextensive and said first means includes an adhesive intermediate said first and second layers, said container including an intermediate layer between said first and second layers at said zone of the container for inhibiting the bonding action of said adhesive at said zone to thereby cause said first and second layers to be weakly bonded together at said zone, said first layer being Mylar and said second layer being polyethylene.

8. A container as defined in claim 4 wherein:
   said zone is mechanically weakened by a crease in said first layer of sheet material, and
   the line of rupture passes through said first layer at said crease and said second layer at said zone.

9. A pack for containing a chemical reaction comprising:
   a rupturable sealed container;
   a first chemical in said rupturable container;
   a second chemical adjacent said rupturable container, said first and second chemicals being chemically reactive to generate or absorb heat;
   container means for containing said second chemical and said rupturable sealed container for permitting mixing of said chemicals upon rupturing of said rupturable container; and
   said rupturable container comprising a sheet of flexible material and first means for joining preselected regions of said sheet to form said container, the material of said sheet having a crease to provide a mechanical weakening of said rupturable container whereby when said container is struck said rupturable sealed container will rupture at said crease in said rupturable container to provide for a mixing of said first and second chemicals.

10. A pack as defined in claim 9 wherein said sheet comprises a layer of Mylar.

11. A pack as defined in claim 9 wherein the preselected regions of the sheet material overlap to form a seam of the rupturable container, said seam projecting outwardly of said rupturable container and being folded over at the juncture of the seam with the rupturable container to thereby form the crease for mechanically weakening the container.

12. A pack for adding heat to or removing heat from an object comprising:
    a rupturable container;
    a first chemical in said rupturable container;
    a second chemical substantially surrounding said rupturable container;
    container means for containing said second chemical, said rupturable container being sealed to prevent contact between said chemicals;
    said chemicals coming into contact upon rupture of the rupturable container and being chemically reactive to give off absorb heat; and
    said rupturable container including first and second layers of flexible sheet material bonded together over first regions thereof to form laminated sheet material, said first and second layers having preselected confronting regions which are bonded together less securely than said first regions of said layers, said laminated sheet material being joined together along predetermined zones to form the rupturable container, said preselected confronting regions of said layers forming a weakened region of the container whereby when the container is struck the weakened region ruptures to allow mixing of the first and second chemicals,
    said predetermined zones of said laminated sheet material being bonded together to form a seam, said seam being within said preselected confronting regions.

13. A pack as defined in claim 12 wherein:
    said seam is bent over substantially at the junction of said seam and said rupturable container to create a crease in said first layer thereby mechanically weakening said first layer whereby when said container means is struck said rupturable container ruptures along a line extending through said second layer at said predetermined zone and through said first layer at said crease, thereby permitting said first and second chemicals to react.

* * * * *